May 15, 1923.
F. SCHAFER
INTERNAL COMBUSTION ENGINE
Original Filed Jan. 21, 1918  6 Sheets-Sheet 1
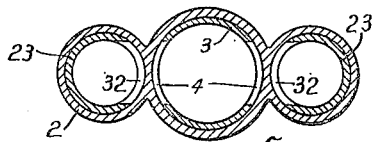
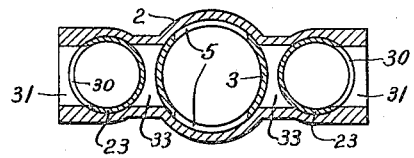
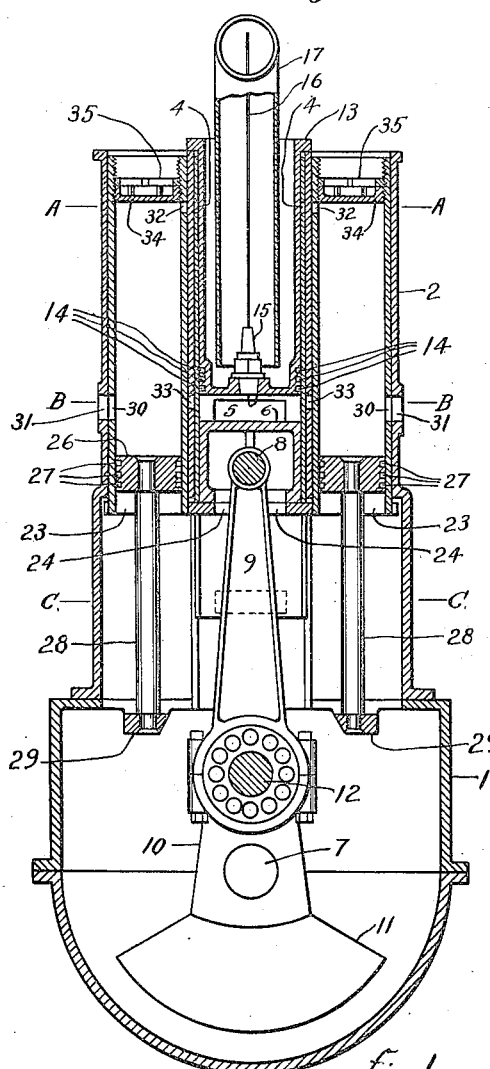
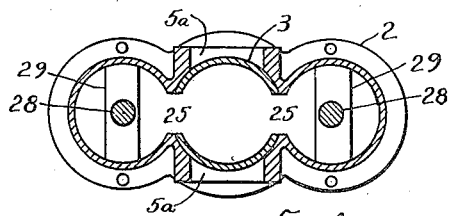
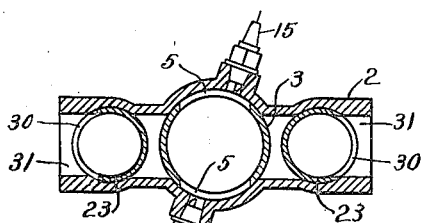
INVENTOR
Frank Schafer.

May 15, 1923.

F. SCHAFER

INTERNAL COMBUSTION ENGINE

Original Filed Jan. 21, 1918    6 Sheets-Sheet 2

1,455,269

WITNESSES.
Marion Maxwell
Frank Schafer Jr.

INVENTOR.
Frank Schafer.

May 15, 1923.

F. SCHAFER 1,455,269

INTERNAL COMBUSTION ENGINE

Original Filed Jan. 21, 1918  6 Sheets-Sheet 5

INVENTOR
Frank Schafer.

WITNESSES:

May 15, 1923.  
F. SCHAFER  
INTERNAL COMBUSTION ENGINE  
Original Filed Jan. 21, 1918 6 Sheets—Sheet 6  
1,455,269
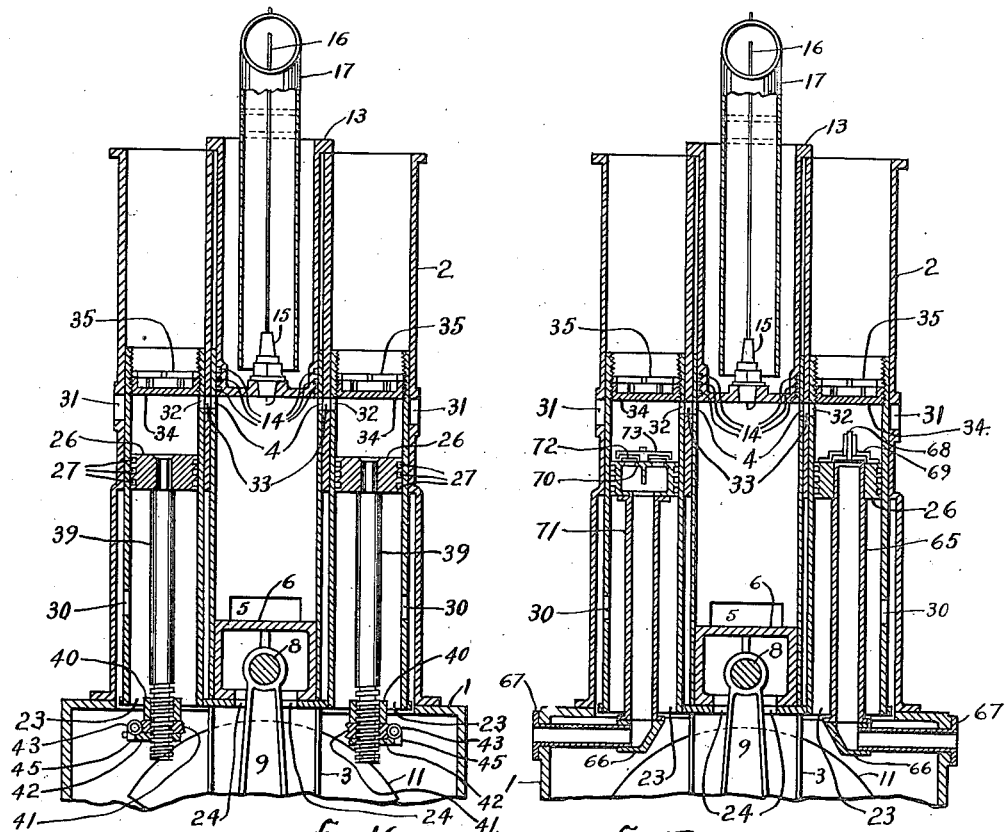
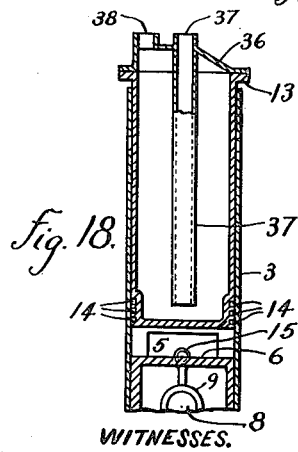
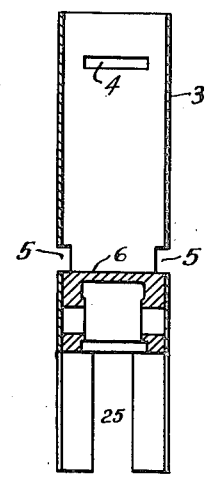
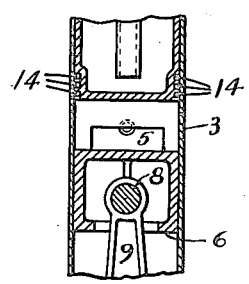
WITNESSES.  
Marion Manwell  
Frank Schafer Jr.
INVENTOR.  
Frank Schafer.

Patented May 15, 1923.

1,455,269

UNITED STATES PATENT OFFICE.

FRANK SCHAFER, OF DULUTH, MINNESOTA.

INTERNAL-COMBUSTION ENGINE.

Refiled for abandoned application Serial No. 213,082, filed January 21, 1918. This application filed November 30, 1921. Serial No. 518,988.

*To all whom it may concern:*

Be it known that I, FRANK SCHAFER, a citizen of the United States, residing at Duluth, in the county of St. Louis and State of Minnesota, have invented new and useful Improvements in Internal-Combustion Engines, of which the following is a specification.

This invention relates to means for causing superinduction or precompressing an explosive mixture of air and gas; of forcing this mixture, under pressure, into the explosion chamber of the engine; of means for varying this precompression; of means for varying the compression in the combustion chamber of the engine; of means for connecting or operating the varying means of both precompression and compression of the combustion chamber either independently or simultaneously in conjunction with one another and in any ratio; of means for causing the explosion to take place within the moving piston; of means for causing the moving piston to perform the function of intake and exhaust valves by opening and closing suitable ports at predetermined positions; of means for causing an explosion at each revolution; of other means for cooling the engine by either air or water; of means new and novel features as may be brought out in the following description.

Referring to the accompanying drawings, in which numerals of reference indicate the same parts throughout the several figures, Figure 1 is a central, sectional view of an engine embodying my invention, showing the piston at the end of its up stroke or compression position.

Figure 2 is a transverse section taken on line A—A of Figure 1.

Figure 3 is a transverse section taken on line B—B of Figure 1.

Figure 4 is a transverse section taken on line C—C of Figure 1.

Figure 5 is a transverse section similar to Figure 3 showing spark plugs in the sides of the cylinders operating through the exhaust ports of the piston.

Figure 16 is a central sectional view showing the piston head f ed with the superinduction cylinders and means for varying the precompression.

Figure 17 is a view showing a modification of Figure 16 in which is shown hollow tubes for the induction of air and gas into the induction cylinders.

Figure 18 is a central sectional view showing the piston head adapted for water cooling.

Figure 19 is a central, sectional view of the piston.

Figure 20 is a central sectional view showing the piston in the advanced spark position.

Figure 6:
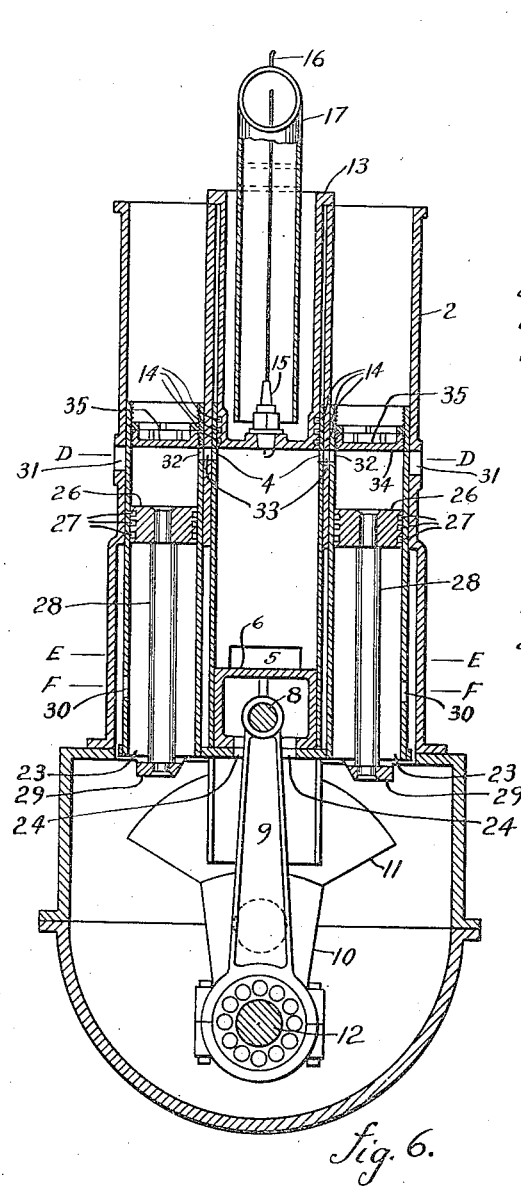
Figure 6 is a central sectional view similar to Figure 1 showing the piston at the end of its down stroke or intake and exhaust position.
Figure 7:
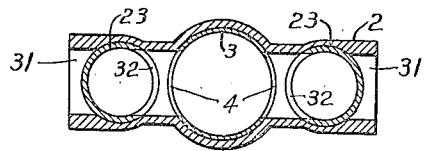
Figure 7 is a transverse section taken on line D—D of Figure 6.
Figure 8:
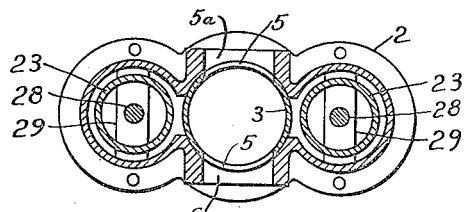
Figure 8 is a transverse section taken on line E—E of Figure 6.
Figure 9:
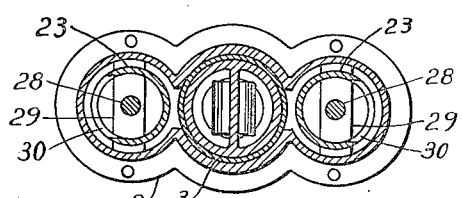
Figure 9 is a transverse section taken on line F—F of Figure 6.
Figure 10:
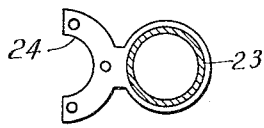
Figure 10 is a view of one of the precompression cylinders and bracket.

Referring to the drawings, 1 indicates the crank case upon which is mounted the cylinder 2, the central portion of which is bored out and in which reciprocates a steel piston, tube 3, having ports 4 near the upper end for admission of the explosive charge and near the center, ports 5 for the discharge of the burnt gases. Secured to the inside of piston tube 3 is a piston or head 6 secured thereto by riveting, welding or in any known manner, this piston is connected to the crank shaft 7 by pin 8 and connecting rod 9. The crank shaft shown is of the built up variety and has the cheeks 10 with balance weights 11 and pin 12; the connecting rod 9 and shaft 7 rotate upon ball bearings. (See Figs.

1, 2, 3, 6, 19.) Secured to the top of the cylinder 2 is a head 13 which extends down into the inside of piston tube 3 and having in suitable grooves at its lower end, piston rings 14 and in the center is a spark plug 15 with its terminal 16 going through and out of a tube 17; the tube extending downward and into the head 13, this tube 17 is secured to the top of head 13 and extends down inside of the head 13 nearly to the bottom but leaving quite a space therebetween and is used for conveying a current of air into the head 13 for cooling purposes. (See Figs. 1, 6, 11, 12, 13, 14, 15, 16, 17.) The air current is furnished by a blower 18 secured to a bracket 19 the latter secured to the front of the crank case 2. The blower is rotated by gear 20 meshing with gear 21 and the latter meshing with gear 22 secured to the crank shaft 7. (See Figs. 11 and 12.)

The cylinder 2 has three openings or bores and the outer two are in line with an equidistant from the central bore and in which reciprocates steel tube 23 welded or otherwise secured to the bracket 24, which is secured to the under side of the piston head 6 and therefore reciprocates with the steel piston tube 3, the latter having a recess 25 on each side through which bracket 24 passes, part of the cylinder walls between the central and outer bores is cut away to permit the movement of bracket 24 and also the to and fro movement of connecting rod 9 (see Figs. 1, 4, 6, 8, 9, 10, 19).

Inside of the steel tubes 23 is a piston 26 having piston rings 27 in suitable grooves and which is secured to a rod 28, the lower end of which is also secured to a bar 29, the latter held to the underside of the crank case 2 by bolts which also pass through suitable holes in the cylinder 2. (See Figs. 1, 4, 6, 8, 9, 11, and 15.)

On the steel tube 23 is an inlet port 30 and which, when the tube 23 is in its uppermost position (see Fig. 1) is directly opposite a similar size port 31 in the cylinder 2. At this point a carbureter or any means of introducing a mixture of air and gas is secured, the downward movement of the steel tube 23 closes the port 31 and compresses the air and gas contained therein and which passes through the port 32 in steel tube 23 and thence through a similar size port 33 in the cylinder 2, and from this port through the port 4 into the combustion chamber formed in the steel tube 3 by the piston head 6 and head 13. (See Figs. 1, 3, 6, 7, 16, 17.) The upper end of the steel tube 23 is closed by a head 34 which is threaded therein and is held or locked in suitable position by a similarly threaded locking ring 35. The head 34 and locking ring 35 are provided with suitable lugs to facilitate turning and locking them in any desirable position. It will be noted that screwing the head in or out, increases or decreases the precompression of the gases. (See Figs. 1, 6, 14, 16, 17.)

Figure 11:
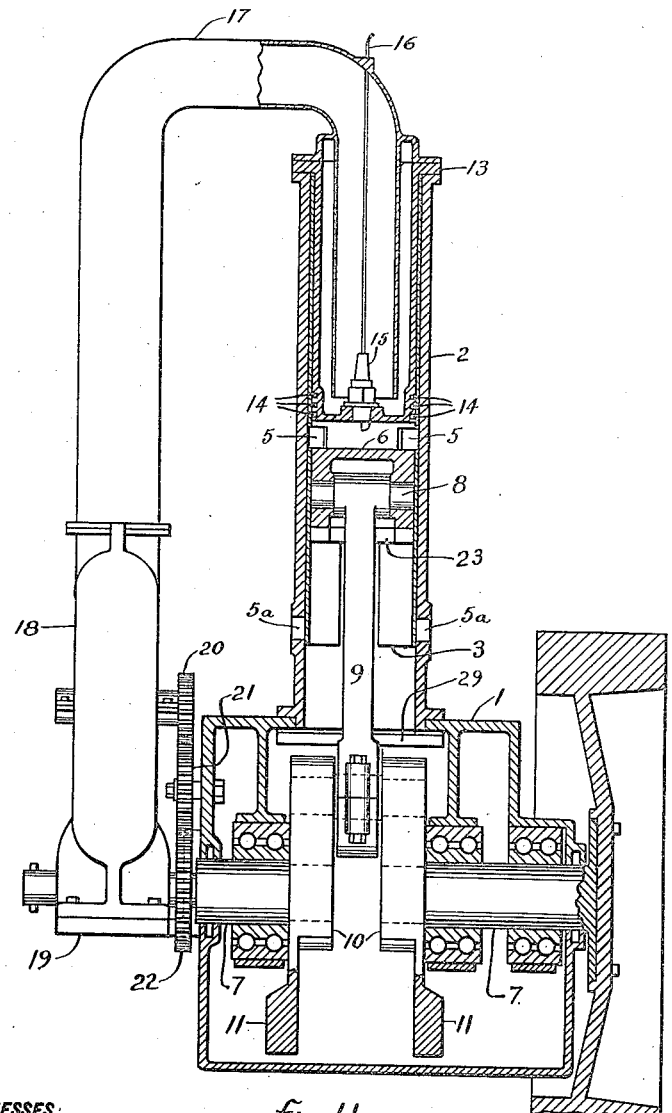
Figure 11 is a central sectional view of Figure 1.
Figure 13:
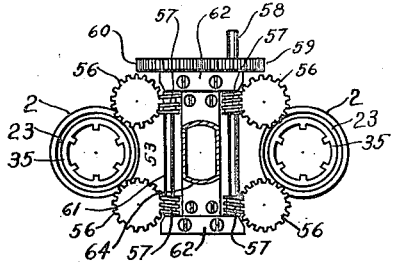
Figure 13 is a plan view of the means for varying the compression of the combustion chamber.
Figure 14:
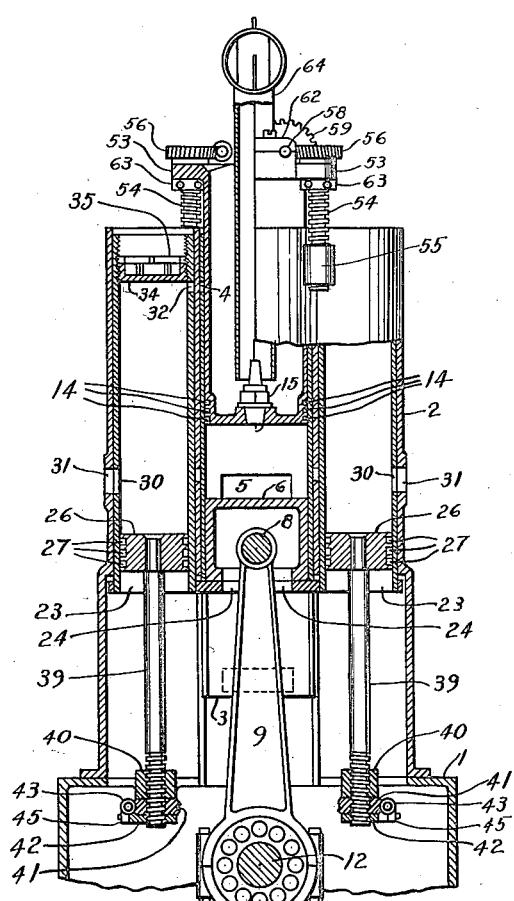
Figure 14 is a view, partly sectional, showing the means for varying the compression of the combustion chamber and varying the precompression of the gases or causing what is known as superinduction.
Figure 15:
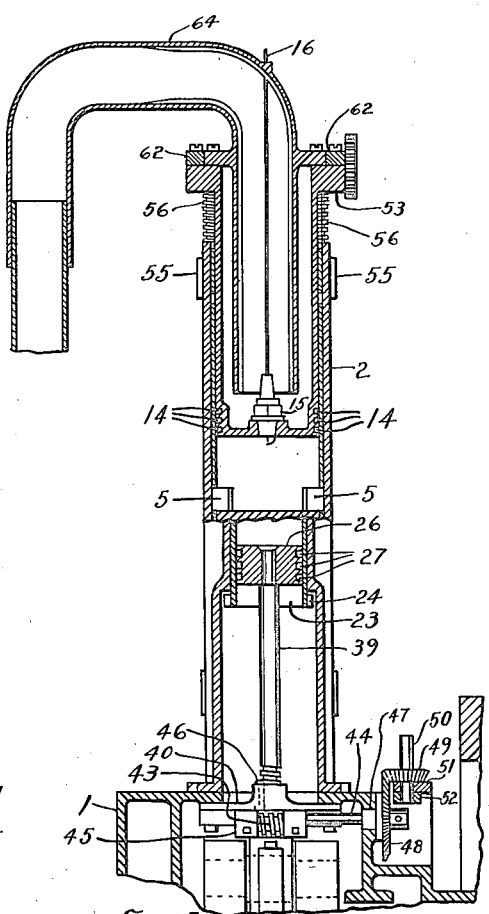
Figure 15 is a view, partly sectional, through the center of part of the compression chamber and through the center of part of one of the super-induction or precompression cylinders.

For water cooling I have provided a head as shown in Figure 18 in which a cap or cover 36 is secured to the head 13 and having a central tube 37 therein through which the water is pumped or forced and after flowing around inside of head 13 is allowed to leave through the opening 38 at the top and thence through a radiator in the usual manner; when the water head is used the spark plug is removed or not used therein but is placed in the side of the cylinder 2 as shown in Figure 5. In this figure I have shown two spark plugs on opposite sides of the cylinder, which operate through the exhaust port 5 of the steel tube 3, the position of the piston 6, when in the zero or upper dead center, is shown in Figure 11 and when the spark is advanced it is as shown in Fig. 20. It is obvious that the two spark plugs can be placed at different heights or positioned so that extreme advanced spark position may be secured and that the explosive gas can be ignited in any position between the dead center and the most advanced spark position. In Figs. 13, 14, 15 I have shown means for varying the precompression of the gases and also the compression in the compression chamber. In Fig. 14 it will be noted that within the tube 23 is the piston 26 with its piston rings 27, the piston 26 is secured to a rod 39, the lower end of which is threaded and passes through a bracket 40 which is secured to the under side of the crank case by suitable bolts which also pass through the holes in the base of cylinder 2 and thus securely hold said bracket 40. The threaded portion of the rod 39 passes through a nut 41 which is held in a recess in the bracket 40 by a plate 42 secured thereto, the outer periphery of the nut 41 is circular and teeth are cut therein similar to a worm gear, and is rotated by a worm 43 on shaft 44, which is held in place by cap 45. A suitable key 46 is let into the bracket 40 and prevents the rod 39 from rotating. A suitable keyway is cut in the threaded portion of the rod 39 into which a part of the key 46 extends, permitting the said rod 39 to move longitudinally but not rotate (see Fig. 15). The shaft 44 also rotates in a suitable bearing 47 in the crank case 1. To the outer end of shaft 44 is secured a bevel gear 48 meshing with another bevel gear 49 secured to a shaft 50, the latter rotating in a bearing 51, secured to the top of crank case 1, a collar 52 holds this shaft in position (see Fig. 15). It is plainly apparent that rotating the shaft 50 will also rotate the worm nut 41, thereby raising or lowering the piston 25, thus increasing or decreasing the precompression as desired. (See Figs. 14 and 15.) For varying the compression in the explosion chamber I have provided a head 53 which is raised or lowered by means of the screw 54, which passes through a suitably threaded lug 55 cast on the side of the cylinder 2. These screws pass through a suitable hole in the head 53 and the upper end is formed into the worm gear 56, meshing with a worm 47 formed on shaft 58; secured to the shaft 58 is a spur gear 59, meshing with a similar gear 60 secured to shaft 61, worms 57 are formed on shaft 61, similar to worms 57 on shaft 58 and these mesh with worm gears 56 formed on the ends of screws 54; the shafts 50 and 61 rotate in suitable bearings on the top of head 53 and are held in place by caps 62. A collar 63 is pinned to the screws 54 so as to hold the head 53 in any desired position. (See Fig. 13, 14.) An air tube 64 is also secured to the top of the head 53 and through the upper end of which passes the high tension terminal 16 to the spark plug. The other end of the tube 64 telescopes over a suitable tube coming from a blower and conducts a current of air into the head 53 for cooling the latter. (See Figs. 13, 14, 15.) It is obvious that rotating the shaft 58 in either direction will rotate the screws 54 thus moving the head up or down and increasing or decreasing the compression in the combustion chamber, the direction of the threads of the screws 54 and worms 57 being such that this movement is effected properly. It is also obvious that by properly connecting the shafts 50 and 58 that the precompression in the cylinder 23 and compression in the combustion chamber can be effected simultaneously and in any ratio.

In Figure 16 I have shown means for varying the precompression of the gases in combination with the stationary head 13 and in Fig. 17 I have shown means for the induction of gases through a hollow tube 65, secured to a bracket 66 through the side of which extends a tube 67, which extends through the crank case 1. To the end of this tube 67 can be secured a carburetor or any suitable means for introducing a mixture of air and gas. At the upper end of the tube 65 is placed a puppet valve 68 sliding in a bracket 69 secured to the top of a piston 26, the latter secured to the top of the tube 65. I have also shown a hollow piston 70 secured to a hollow tube 71, the latter secured to a bracket 60 through the side of which enters a tube 67 extending through the crank case 1, similar to the one shown at the right of this figure. This hollow piston 70 may be provided with a number of flat valves 72, held in place by a bracket or guide 73 secured to the top of the hollow piston 70. This permits of induction as soon as the tubes 23 move upwards and the precompression can be varied by screwing the hand 34 up and down.

The operation is as follows: Noting the position of the crank shaft and tubes as shown in Fig. 6, upon the upward movement to the tubes 23, the ports 32 therein will pass the ports 33 in the cylinders 2, this closes the communication with the outer atmosphere and a vacuum is now created within this tube which continues until the port 30 in the tube 23 passes the port 31 in the cylinder 2. (See Figs. 1, 3, 14.) Assuming that a carburetor has been secured at this point, atmospheric pressure will now cause a charge of air and gas to enter the tube 23. Upon the downward movement of the tube 23, as soon as port 30 has passed port 31, the enclosed charge will be compressed and will enter the combustion chamber as soon as port 32 in tube 23, port 33 in cylinder 2 and port 4 in piston tube 3 are in line as shown in Figs. 6, 7, 16, 17.

It will be noted that ports 32 and 4 in tubes 23 and 3 are always in line and opposite one another and are held in this position by bracket 24, as can be seen in Figs. 1, 6, 14, 16, 17. Referring to Figs. 1 and 6, it will be noted that the compression and consequently the volume of gas that is forced into the combustion chamber can be varied by means of the head 34 and locking ring 35. It is obvious that increasing the pressure of the gases will cause them to enter the combustion chamber at a higher speed and consequently in the same unit of time, a greater volume of gas.

Referring to Figures 14, 15, 16, it is also seen that the precompression of the gases can be varied while the engine is running by means of the worm 43, worm nut 41 operating or moving the rod 39 to which is attached the piston 26.

As seen in Figs. 6, 16, 17 upon the upward movement of the piston tube 3, as soon as the ports 4 pass the ports 33 in the cylinder 2 compression of the inclosed charge begins, and continues until the charge is ignited by the spark plug in the usual manner, its resulting expansion forces the piston down until the ports 5 come opposite the ports 5ª of the cylinder 2 when the burnt gases are discharged, it will be noted that the port 5 is longer than the port 4 and that the burnt gases are partly discharged before the port 4 permits the entrance of a new charge and when this does happen the incoming charge has a tendency to force the exhaust gases out through the exhaust ports.

It will also be noted that very large port openings are secured from the fact that the incoming gases enter through two ports diametrically opposite one another.

Referring to Fig. 11, it will be noted that a short section or a skirt of the tube 3 extends below the piston head 6, covering the exhaust ports 5ª, thus preventing any burnt gases entering the crank case.

Figure 12:
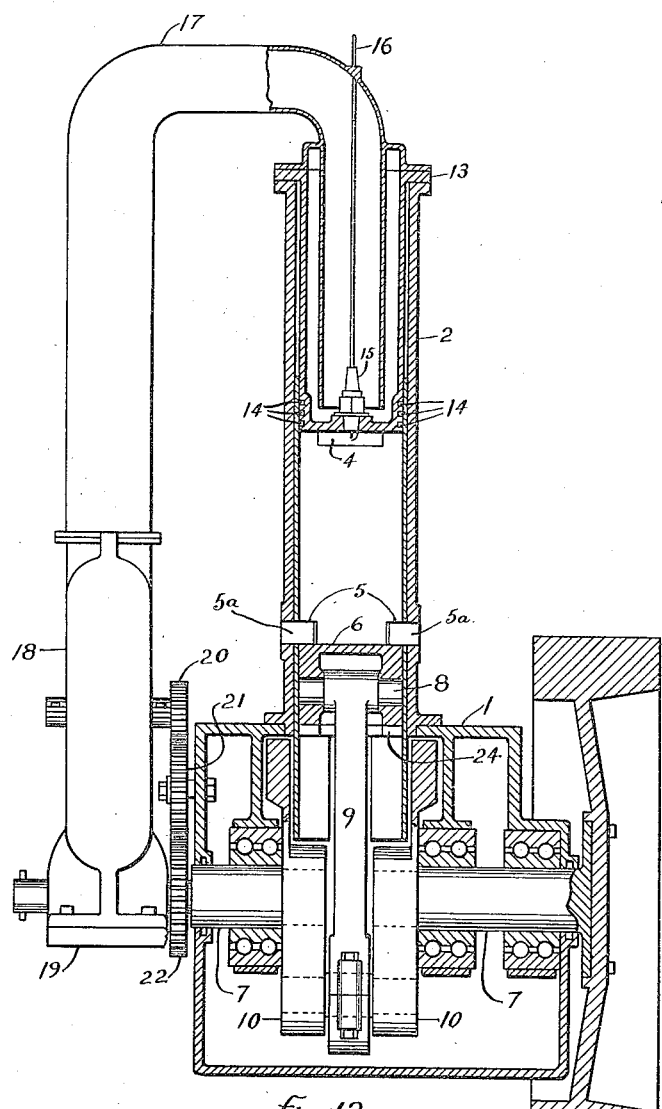
Figure 12 is a central sectional view of Figure 6.

On the downward stroke of the piston, as seen in Fig. 12, it will be noted that the tube 3 passes between the balance weights 11 of the crank cheeks 10.

Referring to Figs. 14 and 15, it will be seen that by rotating the shaft 58, will also rotate gears 59 and 60, which in turn will simultaneously rotate worm 57 and consequently worm gears 56. Since these are part of the screws 54 which are threaded in the lugs 55 of the cylinder 2 this will cause the head to move up or down and increase or decrease the compression of the compression chamber.

It is plainly seen that the shafts 50 and 58 can be rotated while the engine is running and can be operated independently or can be connected by any suitable means and operated simultaneously in any desired ratio, thus effecting what is known as superinduction and also varying the compression of the gases in the combustion chamber at will. This feature is of special value in aeroplane engines, as by increasing the precompression and also the compression in the combustion chamber, will compensate for the lower tension of the atmosphere at high altitudes.

In the construction shown, it is seen that this engine can be run in either direction, that an explosion is effected at each revolution, giving a much more even torque, and that noisy valves, springs and tappets with the consequent regrinding, setting and timing is avoided.

The reciprocating parts of this engine are cushioned on the down stroke by the precompression of the air and gas in the tubes 23 and on the up stroke by the partial vacuum in said tubes and the compression in the combustion chamber.

Referring to Figs. 11 and 12, it is seen that the blower 18 could be built directly on shaft 7, as the rotating part of the blower could be fastened to the shaft 7, thus eliminating the gears.

Having thus described my invention, what I claim is:

1. In an internal combustion engine, a stationary cylinder having ports therein, a piston of tubular form having ports therein, means for reciprocating the piston so that the ports therein will cooperate with ports in the cylinder and perform the functions of valves for the intake and exhaust of gases and adjustable means for precompressing the gases.

2. In an internal combustion engine, a stationary cylinder having ports therein, a piston of tubular form having ports therein, means for reciprocating the piston so that the ports therein will cooperate with ports in the cylinder and perform the function of valves for the intake and exhaust of gases and adjustable means for precompressing the gases connected to said tubular piston.

3. In an internal combustion engine, a stationary cylinder having ports therein, a piston of tubular form having ports therein and connected on either side with a gas compressor having ports in alinement with ports in said piston, means for reciprocating the piston so that the ports therein will cooperate with ports in the cylinder and perform the function of valves for the intake and exhaust of gases and means for varying the precompression of the gases.

4. In an internal combustion engine, a cylinder having ports therein, a piston of tubular form having ports therein, means for reciprocating the piston so that the ports therein will cooperate with the ports in the cylinder, cylindrical tubes connected with said tubular piston and reciprocating therewith and ports in said cylindrical tubes cooperating with ports in said cylinder for the intake of gases.

5. In an internal combustion engine, a cylinder having ports therein, a piston of tubular form having ports therein, means for reciprocating the piston so that the ports therein will cooperate with the ports in the cylinder, cylindrical tubes connected on either side to said tubular piston and reciprocating therewith, and ports in said cylindrical tubes cooperating with ports in said cylinder for the discharge of the precompressed gases into the tubular piston.

6. In an internal combusion engine, a cylinder having ports therein, a piston of tubular form having ports therein, means for reciprocating the piston so that the ports therein will cooperate with the ports in the cylinder, cylindrical tubes connected on either side with said tubular piston and reciprocating therewith, ports in said cylindrical tubes cooperating with ports in said cylinder for the intake and discharge of gases.

7. In an internal combustion engine a cylinder having ports therein, a piston of tubular form having ports therein, means for reciprocating the piston so that the ports therein will cooperate with the ports in the cylinder, cylindrical tubes connected with said tubular piston and reciprocating therewith, ports in said cylindrical tubes cooperating with ports in said cylinder for the intake and discharge of gases and means connected to the cylindrical tubes for varying the precompression of the gases.

8. In an internal combustion engine a cylinder having ports therein, a piston of tubular form having ports therein, means for reciprocating the piston so that the ports therein will cooperate with the ports in the cylinder, cylindrical tubes connected with said tubular piston and reciprocating therewith, ports in said cylindrical tubes cooperating with ports in said cylinder for the intake and discharge of gases and means 9. In an internal combustion engine a cylinder having ports therein, a piston of tubular form having ports therein, means for reciprocating the piston so that the ports therein will cooperate with the ports in the cylinder, cylindrical tubes connected with said tubular piston and reciprocating therewith, ports in said cylindrical tubes cooperating with ports in said cylinder for the intake and discharge of gases and means for varying the precompression of the gases while the engine is running.

10. In an internal combustion engine a cylinder having ports therein, a piston of tubular form having ports therein, means for reciprocating the piston so that the ports therein will cooperate with the ports in the cylinder, cylindrical tubes connected with said tubular piston and reciprocating therewith, ports in said cylindrical tubes cooperating with ports in said cylinder for the intake and discharge of gases and means for varying the precompression of the gases and the compression in the combustion chamber simultaneously.

11. In an internal combustion engine a cylinder a tubular piston mounted therein, ports in said cylinder, ports in said piston, means for reciprocating the piston so that the ports therein will cooperate with the ports in the cylinder, cylindrical tubes connected with said tubular piston and reciprocating therewith, ports in said cylindrical tubes cooperating with ports in said cylinder for the intake and discharge of gases, and means for varying the precompression of the gases and the compression in the combustion chamber simultaneously and in any ratio.

12. In an internal combustion engine, a stationary cylinder, a tubular piston therein, cylindrical tubes connected with said tubular piston and reciprocating therewith, pistons in said cylindrical tubes and means for moving said pistons longitudinally.

13. In an internal combustion engine, a stationary cylinder, a tubular piston therein, cylindrical tubes on either side connected with said tubular piston therein, and reciprocating therewith, pistons in said cylindrical tubes and means for moving said pistons longitudinally.

14. In the internal combustion engine, a cylinder, a tubular piston, means for reciprocating said piston and intake and exhaust ports therein, spark plugs at diametrically opposite points in said cylinder and operating through the exhaust ports, said spark plugs set at different levels to vary the point of ignition.

15. In an internal combustion engine, a support provided with a central bore, a tubular piston reciprocating therein; a head adjustably secured to said support and extending into the cavity of said piston so as to form in conjunction therewith an explosion chamber, said support provided with additional bores in each of which is positioned a compression cylinder arranged to reciprocate with said piston, a stationary piston fixed to said support and mounted in each compression cylinder, port opening in the walls of said piston, similar ports in first named cylinder and each of said compression cylinders, said ports adapted to be brought in alinement for introducing an explosive charge into said chamber and means to ignite said charge.

In testimony whereof I have hereunto set my hand.

FRANK SCHAFER.